(12) United States Patent
Barbosa Neira et al.

(10) Patent No.: US 10,403,310 B1
(45) Date of Patent: *Sep. 3, 2019

(54) HYPERBOLIC METAMATERIAL-BASED NEAR-FIELD TRANSDUCER FOR HEAT ASSISTED MAGNETIC RECORDING HEAD

(71) Applicant: Seagate Technology LLC, Cupertino, CA (US)

(72) Inventors: Andres David Barbosa Neira, Derry (GB); Roberto Fernandez Garcia, Derry (GB); Michael James Hardy, Londonderry (GB); Choon How Gan, Derry (GB); Mark Anthony Gubbins, Donegal (IE); Florin Zavaliche, San Ramon, CA (US); Tong Zhao, Eden Prairie, MN (US); Martin Giles Blaber, Plymouth, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/036,155

(22) Filed: Jul. 16, 2018

Related U.S. Application Data

(63) Continuation of application No. 15/437,995, filed on Feb. 21, 2017, now Pat. No. 10,026,421.
(Continued)

(51) Int. Cl.
*G11B 11/105* (2006.01)
*G11B 5/187* (2006.01)
(Continued)

(52) U.S. Cl.
CPC .......... *G11B 5/1871* (2013.01); *G11B 5/4866* (2013.01); *G11B 5/1872* (2013.01);
(Continued)

(58) Field of Classification Search
None
See application file for complete search history.

(56) References Cited

U.S. PATENT DOCUMENTS

| | | | |
|---|---|---|---|
| 8,755,650 B2 | 6/2014 | Peng | |
| 8,848,495 B1 * | 9/2014 | Wu | G11B 5/3133 369/13.33 |

(Continued)

OTHER PUBLICATIONS

Anomalously Weak Scattering in Metal-Semiconductor Multilayer Hyperbolic Metamaterials, Shen et al, American Physical Society, May 29, 2015.*

(Continued)

*Primary Examiner* — Tan X Dinh
(74) *Attorney, Agent, or Firm* — Hollingsworth Davis, LLC

(57) ABSTRACT

An apparatus comprises a slider configured for heat-assisted magnetic recording. A near-field transducer comprising a peg is situated at or near an air bearing surface of the slider, and an optical waveguide of the slider is configured to couple light from a light source to the near-field transducer. The peg comprises a hyperbolic metamaterial, and the near-field transducer may further include an enlarged portion from which the peg extends, where the enlarged portion may also comprise a hyperbolic metamaterial.

8 Claims, 12 Drawing Sheets

Related U.S. Application Data

(60) Provisional application No. 62/296,938, filed on Feb. 18, 2016, provisional application No. 62/362,372, filed on Jul. 14, 2016.

(51) Int. Cl.
    *G11B 5/48*     (2006.01)
    *G11B 5/60*     (2006.01)
    *G11B 5/00*     (2006.01)

(52) U.S. Cl.
    CPC ......... *G11B 5/1874* (2013.01); *G11B 5/6088* (2013.01); *G11B 2005/0021* (2013.01)

(56) References Cited

U.S. PATENT DOCUMENTS

| | | | |
|---|---|---|---|
| 9,019,803 B1* | 4/2015 | Jin | G11B 13/08 |
| | | | 369/13.33 |
| 9,465,160 B2 | 10/2016 | Keimel et al. | |
| 9,940,953 B1* | 4/2018 | Zavaliche | G11B 5/314 |
| 10,026,421 B1* | 7/2018 | Barbosa Neira | G11B 5/1871 |
| 2010/0046083 A1* | 2/2010 | Peng | B82Y 20/00 |
| | | | 359/653 |
| 2011/0181979 A1* | 7/2011 | Jin | G11B 5/314 |
| | | | 360/59 |
| 2012/0328240 A1* | 12/2012 | Ma | B82Y 20/00 |
| | | | 385/33 |
| 2013/0064514 A1* | 3/2013 | Peng | G11B 5/3133 |
| | | | 385/124 |
| 2014/0028424 A1 | 6/2014 | Dede et al. | |
| 2015/0055924 A1* | 2/2015 | Keimel | G02B 6/1226 |
| | | | 385/130 |
| 2015/0285953 A1 | 10/2015 | Naik et al. | |
| 2017/0032811 A1* | 2/2017 | Chen | G11B 5/6082 |

OTHER PUBLICATIONS

Near-Field Energy Extraction With Hyperbolic Matamaterials, Shi et al, Dapartment of Mechanical Engineering, Carnegie Mellon University, American Chemical Society, 2015.*

Absorption of Near-Field Generated by Two-Dimensional Array of Dopoles Above a Hyperbolic Matamaterial, Guclu et al, 7th International Congress on Advanced Electromagnetic Materials in Microwaves and Optics, Sep. 2013.*

* cited by examiner

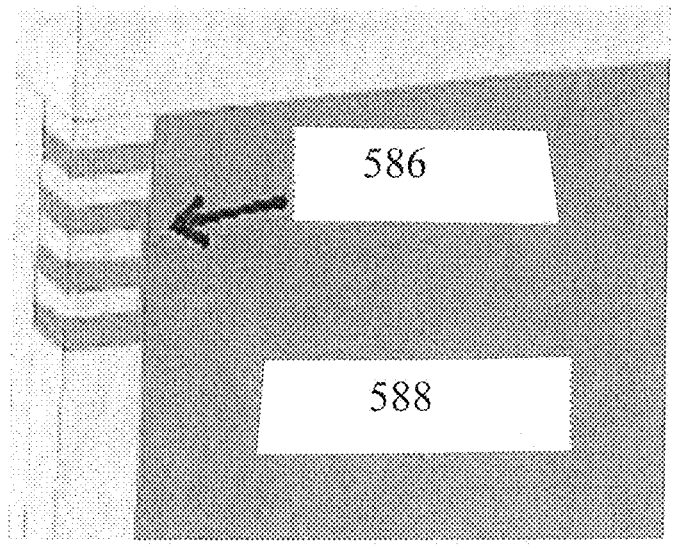
FIG. 5J
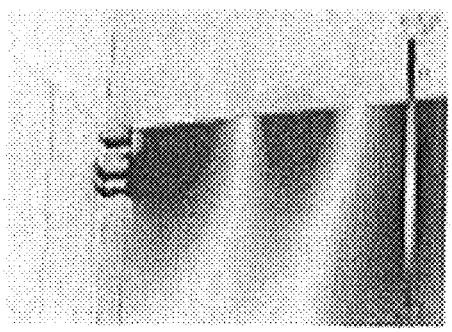 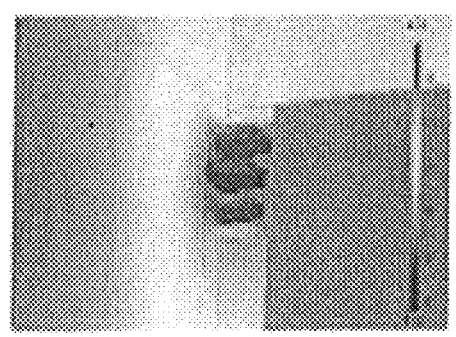
FIG. 5K							FIG. 5L

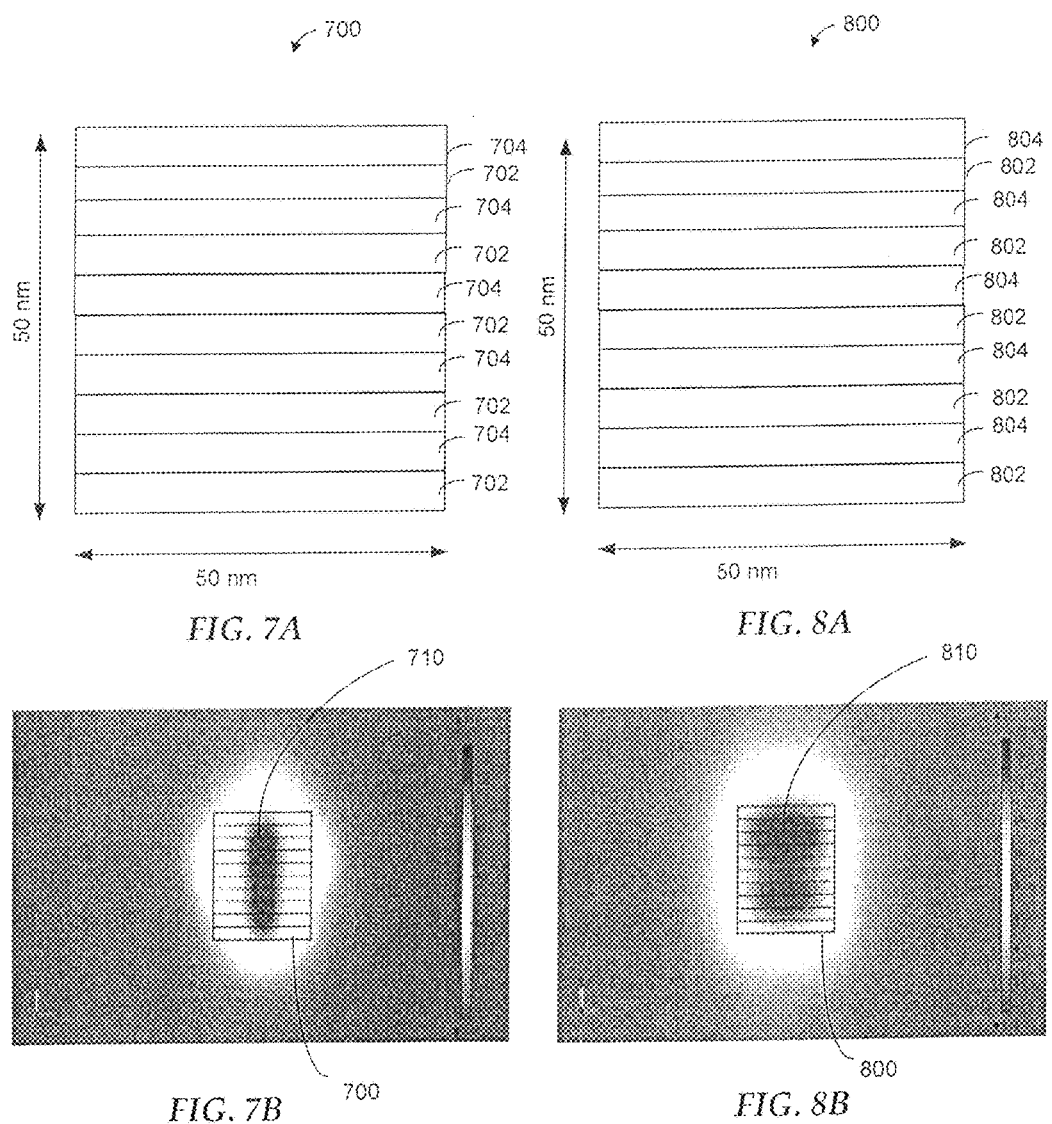

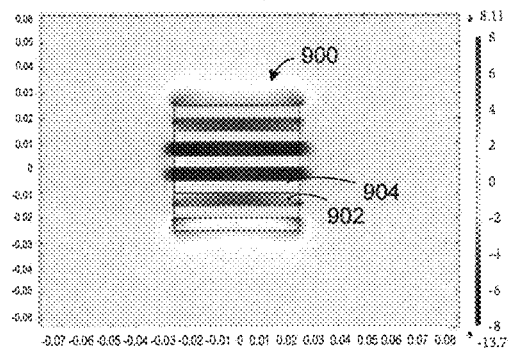 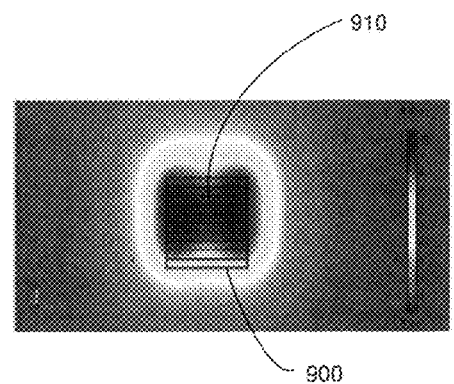
*FIG. 9A*          *FIG. 9B*
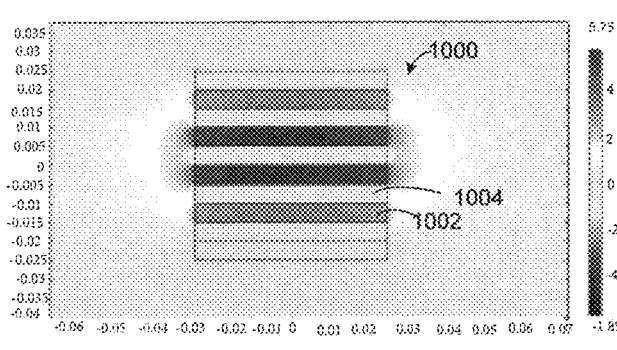 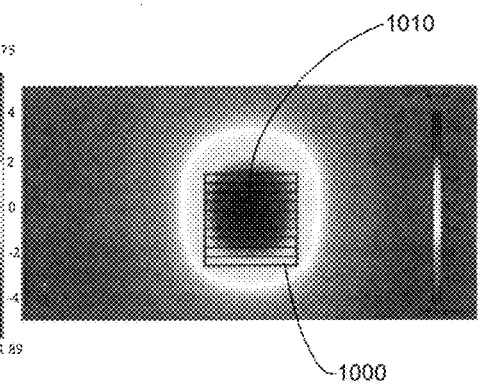
*FIG. 10A*          *FIG. 10B*

US 10,403,310 B1

HYPERBOLIC METAMATERIAL-BASED NEAR-FIELD TRANSDUCER FOR HEAT ASSISTED MAGNETIC RECORDING HEAD

RELATED APPLICATIONS

This application is a continuation of U.S. patent application Ser. No. 15/437,995, filed Feb. 21, 2017, which claims the benefit of Provisional Patent Application Ser. No. 62/296,938 filed on Feb. 18, 2016, and Provisional Patent Application Ser. No. 62/362,372 filed on Jul. 14, 2016, to which priority is claimed and which are hereby incorporated herein by reference in their entirety.

SUMMARY

Embodiments discussed herein involve an apparatus comprising a slider, a near-field transducer (NFT), and an optical waveguide. The slider is configured for heat-assisted magnetic recording, and the waveguide of the slider is configured to couple light from a light source to the near-field transducer. The near-field transducer comprises a peg situated at or near an air bearing surface of the slider, and the peg comprises a hyperbolic metamaterial.

Further embodiments are directed to an apparatus comprising a slider configured for heat-assisted magnetic recording, an NFT, and an optical waveguide. The optical waveguide is configured to couple light from a light source to the NFT. The NFT comprises a peg situated at or near an air bearing surface of the slider. The peg comprises a plurality of sublayers, where the sublayers comprise alternating a metallic sublayer and an insulating sublayer to comprise a hyperbolic metamaterial.

The above summary is not intended to describe each disclosed embodiment or every implementation of the present disclosure. The figures and the detailed description below more particularly exemplify illustrative embodiments.

BRIEF DESCRIPTION OF THE DRAWINGS

The discussion below makes reference to the following figures.

FIG. 5J is a close-up view of the hyperbolic metamaterial of FIG. 5I in accordance with various embodiments discussed herein;

FIG. 5K is a field profile of a plasmon wave exciting a hyperbolic metamaterial peg in accordance with various embodiments discussed herein;

FIG. 5L is a temperature profile of a hyperbolic metamaterial peg in accordance with various embodiments discussed herein;

FIG. 7A shows a peg of a near-field transducer comprising a hyperbolic metamaterial in accordance with various embodiments discussed herein;

FIG. 7B shows a profile of a hotspot produced on a magnetic recording medium by excitation of the highest order modes propagating within the hyperbolic metamaterial peg of FIG. 7A;

FIG. 8A shows a peg of a near-field transducer comprising a hyperbolic metamaterial in accordance with various embodiments discussed herein;

FIG. 8B shows a profile of a hotspot produced on a magnetic recording medium by excitation of the highest order modes propagating within the hyperbolic metamaterial peg of FIG. 8A;

FIG. 9A shows an electric field profile of the lowest TM (transverse magnetic) mode excited in a hyperbolic metamaterial peg such as that of FIG. 7A;

FIG. 9B shows a profile of a hotspot produced on a magnetic recording medium by excitation of the lowest TM mode propagating within the hyperbolic metamaterial peg of FIG. 9A;

FIG. 10A shows an electric field profile of the lowest TM mode excited in a hyperbolic metamaterial peg such as that of FIG. 8A;

FIG. 10B shows a profile of a hotspot produced on a magnetic recording medium by excitation of the lowest TM mode propagating within the hyperbolic metamaterial peg of FIG. 10A;

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
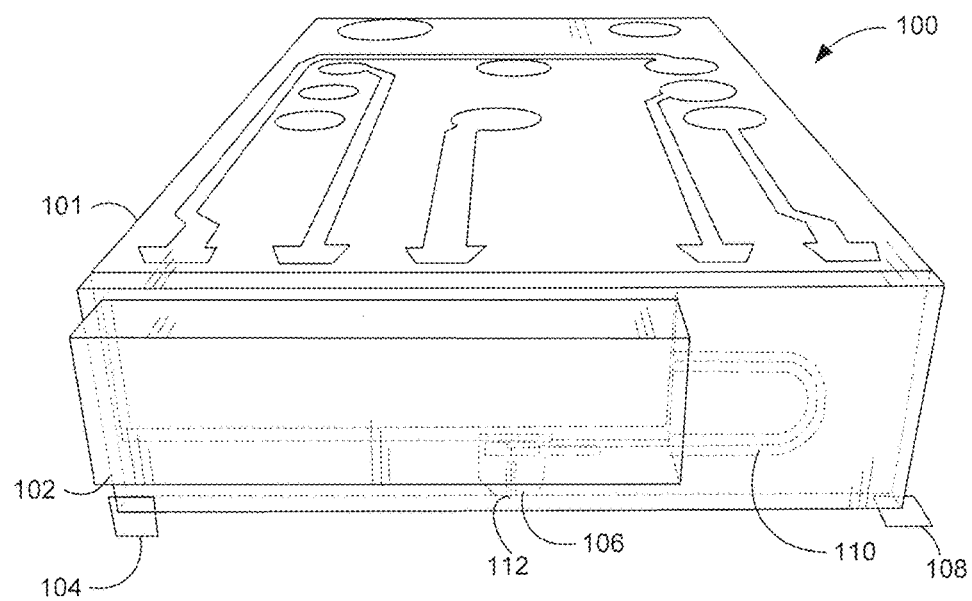
FIG. 1 is a perspective view of a heat assisted magnetic recording (HAMR) slider in accordance with various embodiments discussed herein.

Heat assisted magnetic recording (HAMR), also sometimes referred to as thermal-assisted magnetic recording (TAMR) or energy assisted magnetic recording (EAMR), is a technology that enables areal storage density in hard disk drives well beyond 1 Tb/in$^2$, e.g., to 5 Tb/in$^2$ in theory, using the high magnetocrystalline anisotropy of FePt. The recording process starts by heating a small region of the disk above Curie temperature ($T_c$) using a laser powered near-field plasmonic transducer. The region is subsequently cooled rapidly in the presence of a magnetic field from the recording head. The magnetic field maintains the orientation of magnetization in the local region of heated media as it cools, thereby encoding a bit with data for storage. By reducing the local media anisotropy (K) at high temperature (e.g., above $T_c$), HAMR makes it possible to record data on high anisotropy material such as $L1_0$-FePt. The high anisotropy in $L1_0$-FePt extends the superparamagnetic limit faced with conventional magnetic recording, so that grain size can be further reduced to increase signal-to-noise ratio and area density. The heated area in the storage layer of the recording medium determines the data bit dimensions, and linear recording density is determined by the sharpness of magnetic transitions between the data bits.

In order to achieve desired data density, a HAMR recording head (e.g., slider) includes optical components that direct light from a laser to the recording media. The HAMR media hotspot may need to be smaller than a half-wavelength of light available from current sources (e.g., laser diodes). Due to what is known as the diffraction limit, optical components cannot focus the light at this scale. One way to achieve tiny, confined hot spots is to use an optical NFT, such as a plasmonic optical antenna. The NFT is designed to support local surface-plasmons at a designed light wavelength. At resonance, high electric field surrounds the NFT due to the collective oscillation of electrons in the metal. Part of the field will get absorbed by a storage medium, raising the temperature of the medium locally for recording. During recording, a write element (e.g., write pole) applies a magnetic field to the heated portion of the medium. The heat lowers the magnetic coercivity of the media, allowing the applied field to change the magnetic orientation of the heated portion. The magnetic orientation of the heated portion determines whether a one or a zero is recorded. By varying the magnetic field applied to the magnetic recording medium while it is moving, data is encoded onto the medium. However, in HAMR the propensity of plasmonic NFT materials to undergo physical and/or chemical changes under large thermal stress impacts the stability and reliability of the head's light delivery structure. Plasmonic materials are those that have the real part of the electric permittivity less than zero—if refractive index is n+ik where n is the real part and k is the imaginary part, plasmonic materials have k>n. Gold and Au-based alloys are some examples of plasmonic NFT materials. HAMR head failure can then result from NFT peg-enlarged portion separation, peg deformation, and/or chemical modification. Embodiments described herein are directed to replacing the plasmonic elemental metal or metal alloy materials of the NFT peg and/or enlarged portion with metal/ceramic nanostructured materials known as hyperbolic metamaterials.

Figure 2:
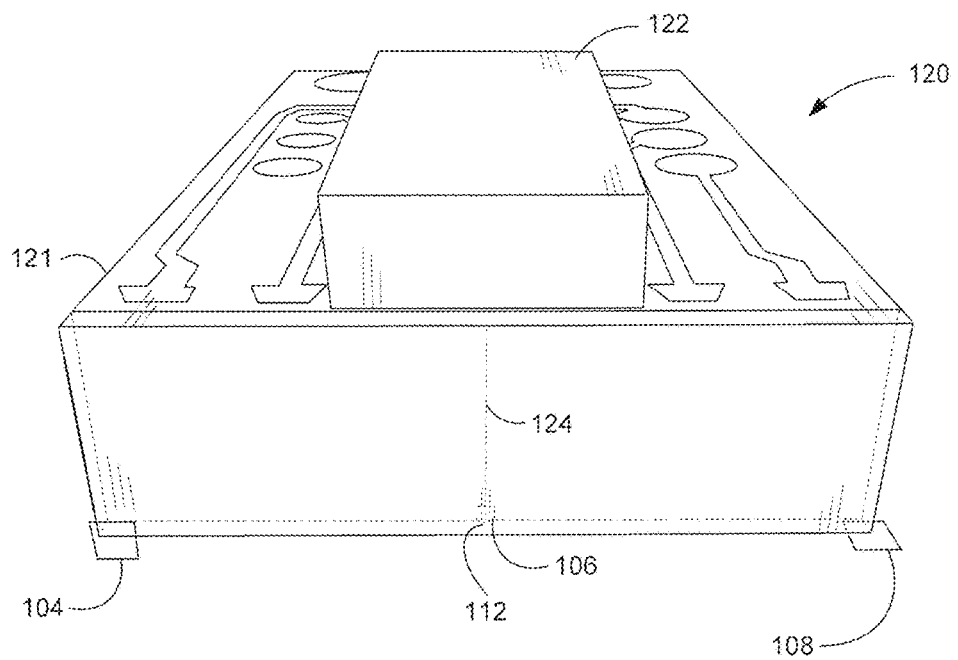
FIG. 2 is a perspective view of a HAMR slider in accordance with various embodiments discussed herein.

A HAMR drive uses a laser diode to heat the media to aid in the recording process. Due to inefficiencies of electric to optical power, the laser diode also heats itself during lasing. Components (writer, reader, heat elements) in the magnetic slider also dissipate heat and the heat is conducted to the laser diode as the laser diode submount is mounted on the slider. To illustrate possible optical transmission paths, FIGS. 1 and 2 show perspective views of HAMR configurations according to example embodiments. In FIG. 1, slider 100 has a laser-in-slider (LIS) configuration. In this configuration, slider 100 includes a slider body 101 having an edge-emitting laser diode 102 integrated into a trailing edge surface 104 of the slider body 101. In this example, the laser diode 102 is disposed within a cavity formed in the trailing edge surface 104. The laser diode 102 is proximate to a HAMR read/write element 106, which has one edge on an air bearing surface 108 of the slider 100. The air bearing surface 108 faces and is held proximate to a moving media surface (not shown) during device operation.

While here the read/write element 106 is shown as a single unit, this type of device may have a physically and electrically separate read element (e.g., magnetoresistive stack) and write element (e.g., a write coil and pole) that are located in the same general region of the slider 100. The separate read and write portion of the read/write element 106 may be separately controlled (e.g., having different signal lines, different head-to-media spacing control elements, etc.), although they may share some common elements (e.g., common signal return path). It will be understood that the concepts described herein apply to devices that have one or multiple write elements on a given recording head.

The laser diode 102 provides electromagnetic energy to heat the media surface at a point near to the read/write element 106. Optical path components, such as a waveguide 110, are formed integrally within the slider 100 to deliver light from the laser diode 102 to the media. In particular, a local waveguide and NFT 112 may be located proximate the read/write element 106 to provide local heating of the media during write operations.

In FIG. 2, a laser-on-slider (LOS) configuration 120 is illustrated. This example includes a laser diode 122 that is mounted on a top surface of a slider body 121. The laser diode 122 is coupled to an optical path of the slider body 121 that includes, among other things, an optical path 124 (e.g., a straight waveguide). In this configuration, the laser diode 122 may also be edge-emitting, such that the light is emitted from the laser diode 122. In order to direct the light towards the air bearing surface 108, the laser diode 122 (or other component) may include optical path elements such as a mirror (not shown) that redirects the light emitted from the laser diode 122 towards the air bearing surface 108. In other configurations, an edge-emitting, top-mounted laser diode may be oriented so that the light emitted directly downwards toward the air bearing surface 108. This may involve placing the laser diode 122 on a submount (not shown) on the top of the slider body 121, the submount orienting the laser output in the desired direction.

While other components shown in FIG. 2, such as the NFT 112 and read/write element 106, are referenced using the same numbers as FIG. 1, the physical configuration of these and other components may differ in the different slider arrangements, e.g., due to the differences in optical coupling pathways, materials, laser power, etc. While not illustrated explicitly in FIGS. 1 and 2, slider configurations may utilize different types of semiconductor laser diodes, such as lasers having a Fabry-Perot laser diode cavity, a distributed Bragg reflector (DBR) laser, and a distributed feedback (DFB) laser. The embodiments described below may be applicable to a variety of energy delivery configurations and laser diode types.

Figure 3:
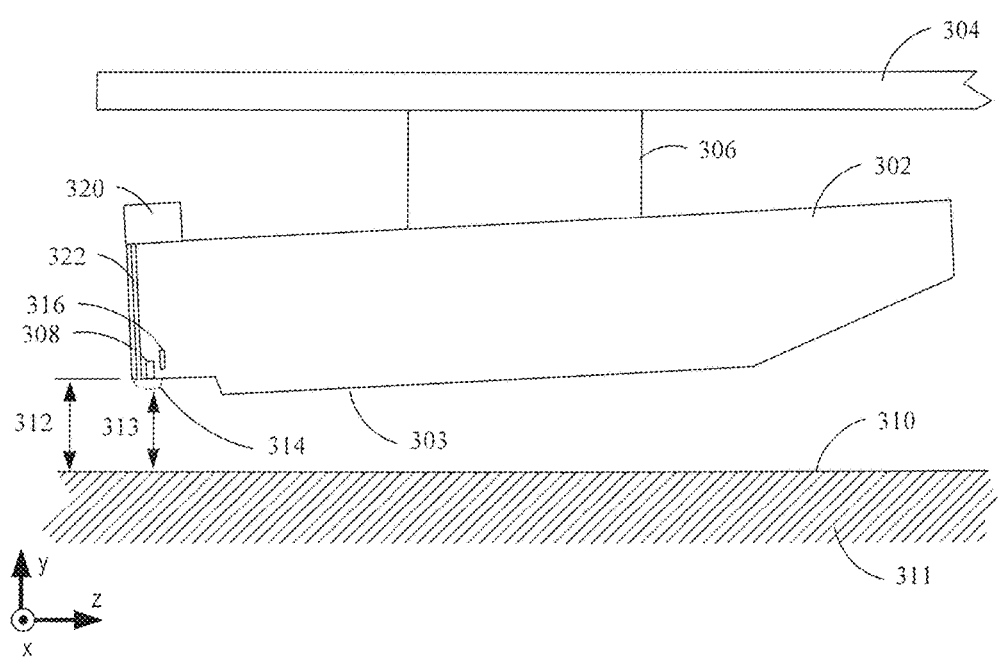
FIG. 3 is a side view of a HAMR slider in accordance with various embodiments discussed herein.

Referring now to FIG. 3, a block diagram shows a side view of a slider 302 according to a representative embodiment. The slider 302 may be used in a magnetic data storage device, e.g., hard drive, configured for HAMR. The slider 302 may also be referred to herein as a read/write head, recording head, etc. The slider 302 is coupled to an arm 304 by way of a suspension 306 that allows some relative motion between the slider 302 and arm 304. The slider 302 includes writing components 308 at a trailing edge that are held proximate to a surface 310 of a magnetic recording medium 311, e.g., magnetic disk. The slider 302 is configured as a HAMR recording head, which includes a laser 320 and a waveguide 322. The waveguide 322 delivers light from the laser 320 to the writing components 308.

When the slider 302 is located over surface 310 of recording medium 311, a flying height 312 is maintained between the slider 302 and the surface 310 by a downward force of arm 304. This downward force is counterbalanced by an air cushion that exists between the surface 310 and an air bearing surface 303 (also referred to herein as a "media-facing surface") of the slider 302 when the recording medium 311 is rotating. It is desirable to maintain a predetermined slider flying height 312 over a range of disk rotational speeds during both reading and writing operations to ensure consistent performance. Region 314 is a "close point" of the slider 302, which is generally understood to be the closest spacing between the writing components 308 and the magnetic recording medium 311, and generally defines the head-to-medium spacing 313. To account for both static and dynamic variations that may affect slider flying height 312, the slider 302 may be configured such that a region 314 of the slider 302 can be configurably adjusted during operation in order to finely adjust the head-to-medium spacing 313. This is shown in FIG. 3 by a dotted line that represents a change in geometry of the region 314. In this example, the geometry change may be induced, in whole or in part, by an increase or decrease in temperature of the region 314 via a heater 316.

Figure 4A:
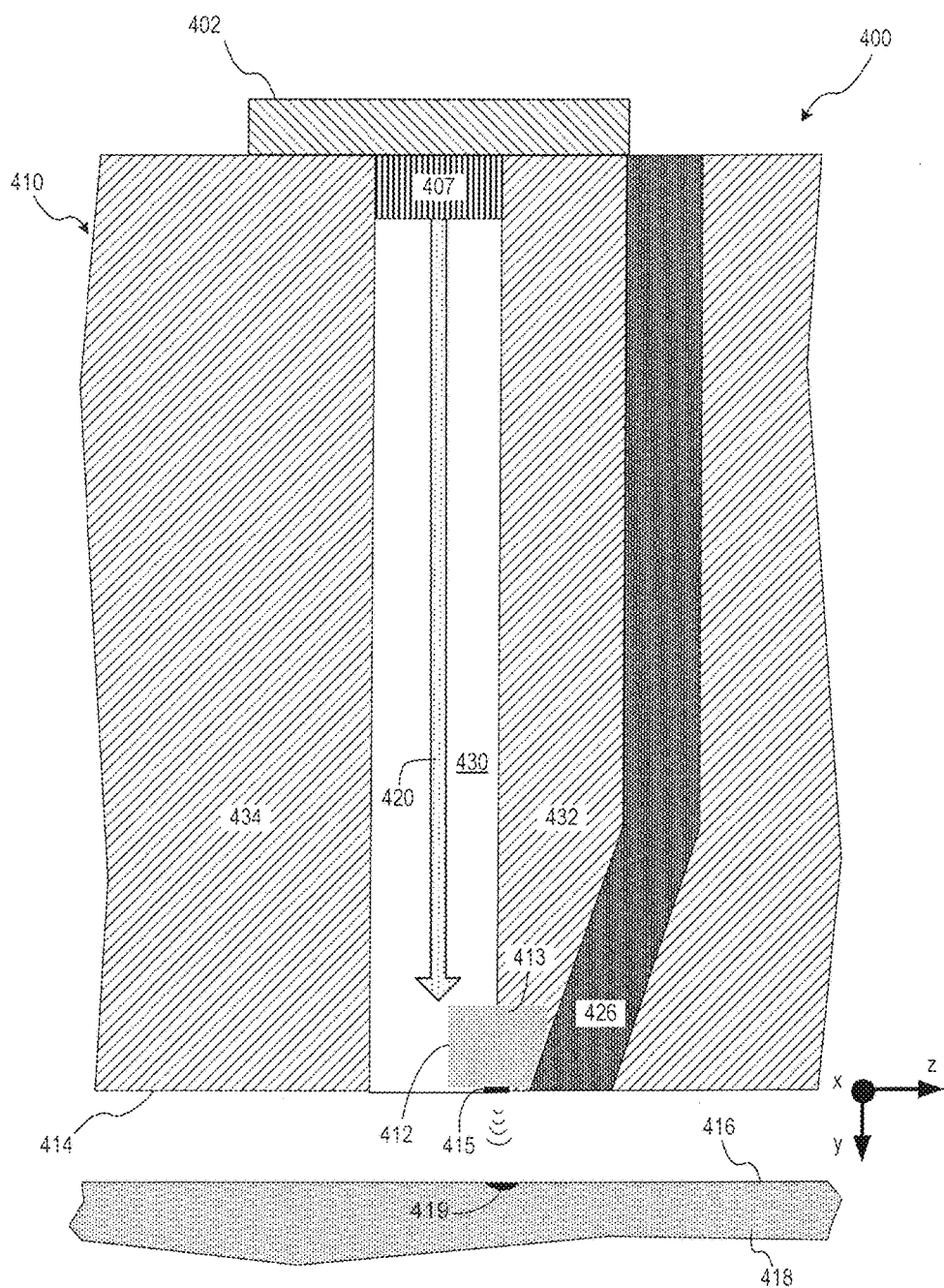
FIGS. 4A-C are cross-sectional views of a portion of a slider configured for HAMR in accordance with various embodiments discussed herein.
Figures 4B, 4C:
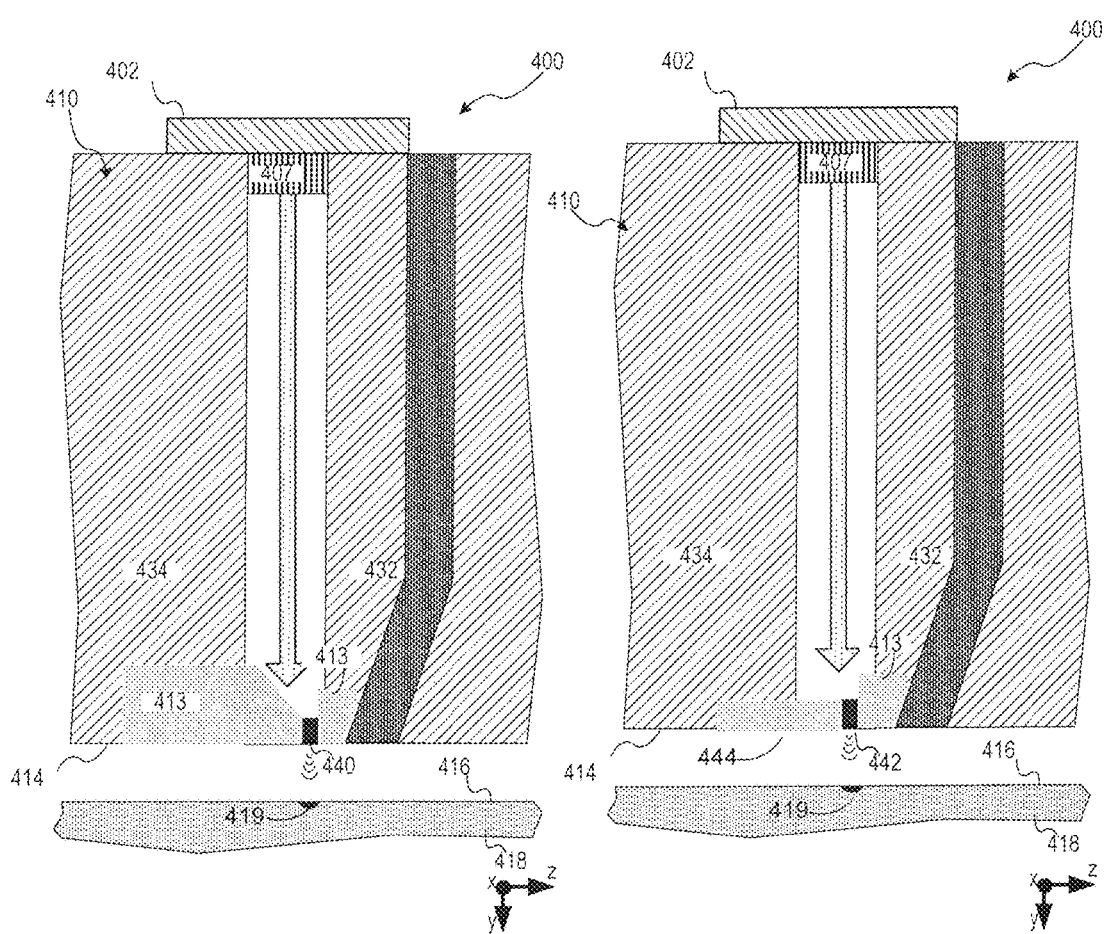

FIGS. 4A-C show detailed partial cross-sectional views of the HAMR slider 400 in accordance with various embodiments. Unless otherwise labeled, corresponding components in the figures are the same. The waveguide 410 includes a layer of core material 430 surrounded by first and second cladding layers 432 and 434. The first cladding layer 432 is shown proximate the NFT 412 and the write pole 426. As can be seen in FIG. 4A, the NFT 412 includes an enlarged region 413 and a peg 415 extending from the enlarged region 413. In some embodiments, the NFT 412 can have a nanorod design, comprising just the peg 415 (i.e., excluding the enlarged region 413). The enlarged region 413 may intersect both the cladding layer 432 and the core layer 430 (as shown) or optionally it may be entirely contained within the cladding layer 432 (not shown) or entirely contained within the core layer 430 (not shown). The second cladding layer 434 is spaced away from the first cladding layer 432 and separated therefrom by the waveguide core 430. The core layer 430 and cladding layers 432 and 434 may be fabricated from dielectric materials, such as optical grade amorphous material with low thermal conductivities. The first and second cladding layers 432 and 434 may each be made of the same or a different material.

The core 430 and cladding layers 432 and 434 may generally be part of a light delivery arrangement or system that receives light from a source 402 (e.g., laser diode) and directs it to the NFT 412. The materials are selected so that the refractive index of the core layer 430 is higher than refractive indices of the cladding layers 432 and 434. This arrangement of materials facilitates efficient propagation of light through the waveguide core 430. Optical focusing elements (not shown) such as mirrors, lenses, etc., may be utilized to concentrate light onto the NFT 412. These and other components may be built on a common substrate using wafer manufacturing techniques known in the art. The waveguide 410 may be configured as a planar waveguide or channel waveguide.

As illustrated, the NFT 412 is positioned proximate the air bearing surface (ABS) 414 (also referred to as a media-facing surface) and the write pole 426. Preferably, a portion of the NFT 412 (e.g., the enlarged portion 413) directly contacts the write pole 426 to provide heatsinking for the NFT 412. Alternatively, additional heat sinking infrastructure can be added in addition to the write pole to assist in heat sinking (not shown). The ABS 414 is shown positioned proximate the surface 416 of the magnetic recording medium 418 during device operation. In the orientation illustrated in FIG. 4A, the ABS 414 is arranged parallel to the x-z plane. Electromagnetic energy (e.g., laser light) 420 from the light source (e.g., laser diode) 402 is delivered to the core 430 of the waveguide 410 via the coupler 407 and propagates in the y-direction toward the NFT 412. The optical wave 420 is delivered to the NFT 412 along the waveguide 410 in the y-direction. The NFT 412 generates surface plasmon enhanced near-field electromagnetic energy proximate the surface 416 of the medium 418, and the energy exits the peg 415 in the y-direction. This results in production of a highly localized hot spot 419 (e.g., about 50 nm in width) on the media surface 416. The write pole 426 generates a magnetic field (e.g., in a y- or perpendicular direction) used for changing the magnetic orientation of the media within hot spot 419 during writing.

FIGS. 4B-C illustrate alternative NFT configurations within a slider 400 cross-section. FIG. 4B illustrates an aperture NFT design where the enlarged portion 413 involves two regions flanking and/or overlapping the waveguide core 430. Between the two enlarged portions 413 is an area 440 that is an aperture that can be partially, or fully, filled with a hyperbolic metamaterial to form a peg. FIG. 4C shows an alternative embodiment of an aperture NFT design. Instead of two enlarged portions 413, the enlarged portion 413 of FIG. 4B located further from the write pole 426 is replaced with a heatsink 444, e.g., comprised of gold. The area 442 between the heatsink 444 and enlarged portion 413 is an aperture that can be partially, or completely, filled with a hyperbolic metamaterial to form a peg.

Various NFT designs can include a peg in accordance with embodiments discussed herein. For example, an NFT can have a single piece design comprising a unitary body including both an enlarged portion and a peg portion or a two-piece design comprising an enlarged portion and a peg portion formed separately. A single piece design results from deposition of the same materials to form both the enlarged and peg portions of the NFT, whereas a two-piece design can involve deposition of differing materials. A two-piece design can also involve materials of similar or identical composition formed in two steps. An NFT peg comprised of hyperbolic metamaterials, as discussed herein, can also be referred to as a "meta-peg."

Figure 5A:
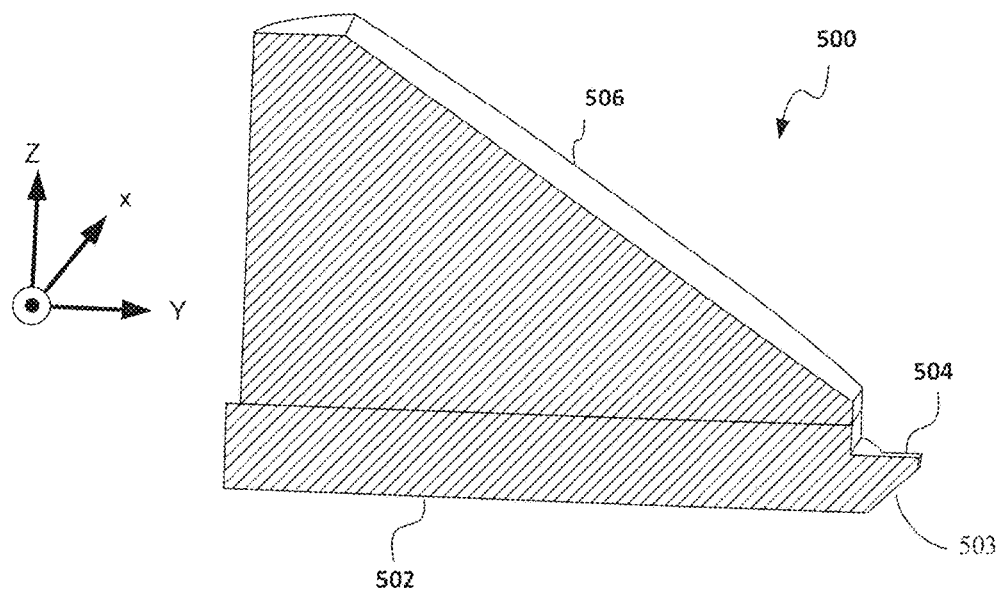
FIG. 5A is a cross-sectional view of a single piece NFT NTS design in accordance with various embodiments discussed herein.
Figure 5B:
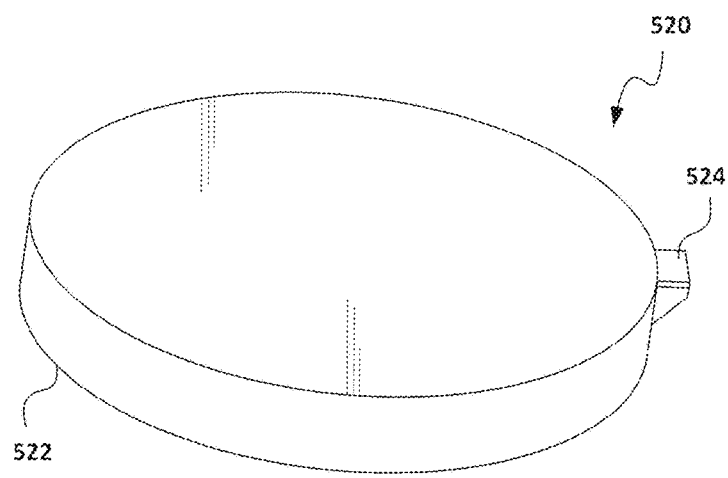
FIG. 5B is a perspective view of a NFT NTL design in accordance with various embodiments discussed herein.

FIGS. 5A-I illustrate examples of NFT designs. FIG. 5A is a cross-sectional of a stadium-style (NTS) design. The illustrated portion of NTT 500 includes an enlarged region 502, a peg region 504 and a heatsink portion 506. The peg 504 extends from the enlarged region 502 toward the media-facing surface 108 (in the light-propagating, or y, direction). The peg region 504 terminates at a distal end at or proximate the air bearing surface 108. The NFT 500 design is shown to include a tapered portion 503 facing away from the heatsink portion 506 and the write pole, not shown, and that reduces the peg dimension in the down-track direction. FIG. 5B illustrates a lollipop-style (NTL) NFT 520. Here, the peg 524 extends from an enlarged portion shaped like a disk 522. Similar to the NTS design 500, the peg 524 extends from the enlarged, disk region 522 toward the media-facing surface 108 (in the light-propagating, or y, direction) and terminates at a distal end at or proximate the air bearing surface 108. NFT 520 is also shown with a tapered peg, however, the peg need not necessarily include a taper. As mentioned above, an NFT can also have a nanorod design, comprising just a peg and no enlarged region.

Figure 5C:
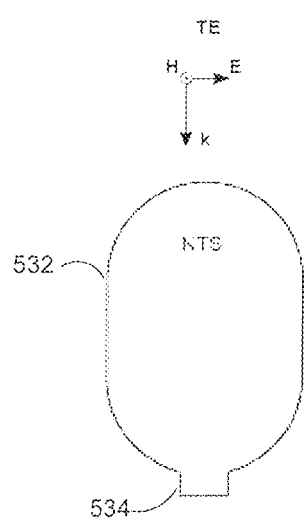
FIG. 5C illustrates a shape of an NTS NFT design in accordance with various embodiments discussed herein.
Figure 5D:
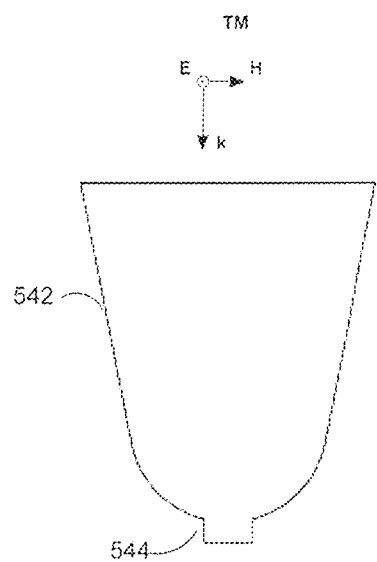
FIG. 5D illustrates a shape of a PPG NFT design in accordance with various embodiments discussed herein.
Figure 5E:
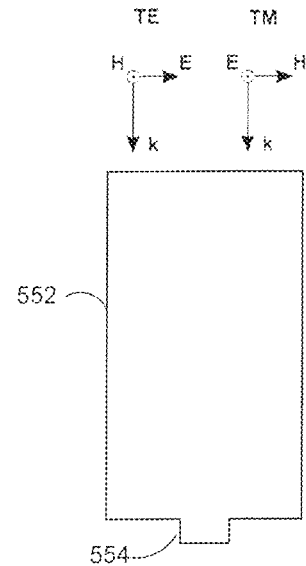
FIG. 5E illustrates a shape of a NTP NFT design in accordance with various embodiments discussed herein.

FIGS. 5C-E illustrate NFTs with approximately the same geometry as those of FIGS. 5A-B but with differently shaped enlarged regions. Similar to FIGS. 5A-B, the pegs 534, 544, and 554 extend from an enlarged region 532, 542, and 552, respectively, toward the media-facing surface 108 (in the light-propagating, or y, direction) and terminate at a distal end at or proximate the air bearing surface 108. The k vector represents the light propagation direction (the y direction), and the NFT designs of FIGS. 5A-C and 5E are oriented with the E field pointing in the transverse (cross-track, x direction). FIG. 5D, which illustrates a planar plasmon generator (PPG) NFT design, is oriented with the E field pointing in the down-track (z direction) for transverse magnetic mode. Similarly, FIG. 5E, which illustrates a NFT postage stamp (NTP) design can be oriented with the E field in either the cross-track or down-track direction, and the aspect ratio of the enlarged portion 552 is adjusted to accommodate the chosen E field direction.

Figure 5F:
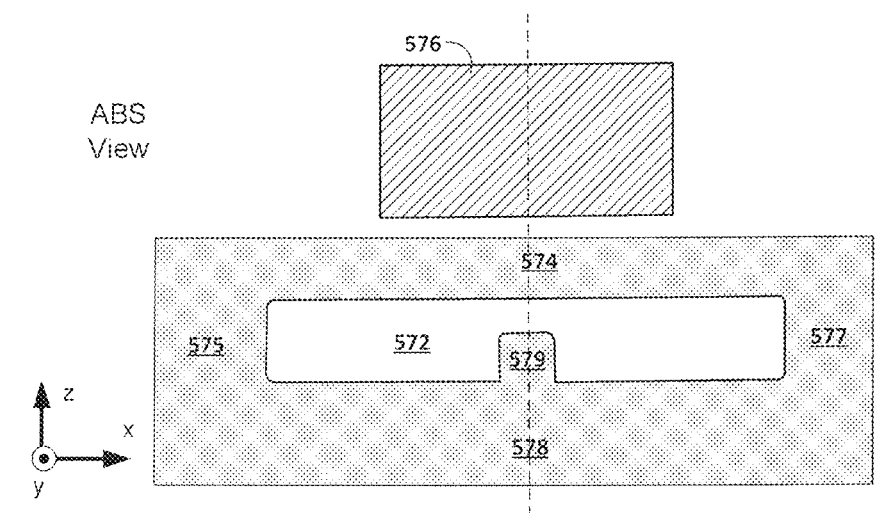
FIGS. 5F-H show views of an aperture NFT in accordance with various embodiments discussed herein.
Figure 5G:
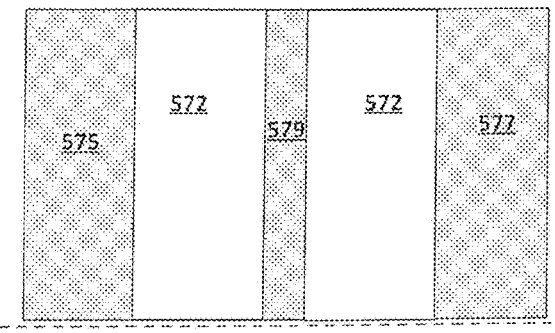
Figure 5H:
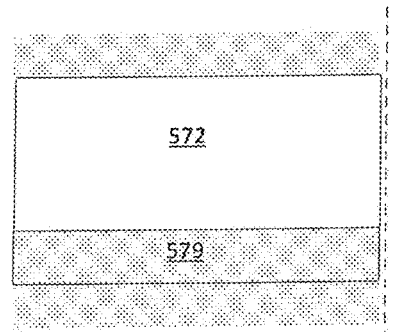

In reference now to FIG. 5F, an ABS view of an NFT geometry is shown in accordance with embodiments described herein. The NFT is disposed at a media-facing surface 108 according to an example embodiment. The x-axis in this figure is aligned in a cross-track direction, and the z-axis is aligned in a down-track direction. The aperture 572 is shown proximate an extension of the write pole 576. The plasmonic material portion 574 forms a top wall that separates the aperture 572 from the write pole 576. Side portions 575, 577 of plasmonic material form side walls surround the aperture 572 in the cross-track direction. Plasmonic portion 578 forms a bottom wall of the aperture 572. These walls are generally normal to the media-facing surface, and surface plasmon resonance causes surface plasmons to be directed in this normal direction to a recording media. FIG. 5G shows a top-down view of the device described in FIG. 5F, and FIG. 5H illustrates a cross-section view. The NFT shown in FIGS. 5F-H will be referred to herein as an "aperture" NFT because the ABS is mostly made of metal with an aperture 572 in it. The aperture 572 allows light to travel from the waveguide core to the recording medium. According to various implementations, an aperture NFT has one, or more, protrusion 579 protruding into the aperture 752 in the x-z plane. The protrusion 579 can comprise multilayer hyperbolic metamaterials as described further below and be considered "a peg" as pegs are described throughout this disclosure.

Figure 5I:
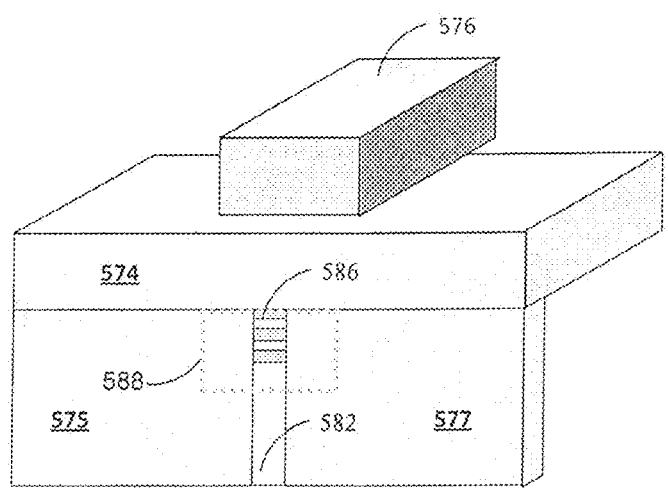
FIG. 5I illustrates a perspective view of an aperture NFT from the ABS in accordance with various embodiments discussed herein.

FIG. 5I illustrates an NFT design similar to that of FIG. 5F. However, as is seen in the ABS view of FIG. 5I, the protrusion 579 is removed. The top wall 574 extends further toward, and optionally up to, the ABS, and the side portions 575, 577 are "thin" (e.g., less than 150 nm thick). Also, the aperture 582 is filled, at least partially, with a hyperbolic metamaterial 586, as described further below, to aid confinement of the light in forming the hot spot. The hyperbolic metamaterial forms a peg-type shape and can be considered "a peg" as pegs are described throughout this disclosure. There is no difference between "peg" NFT designs and "meta-peg" NFT designs whereby an aperture is at least partially filled with a hyperbolic metamaterial as both designs can include peg-like structures comprising a hyperbolic metamaterial. However, the different designs may involve different mode orders. Since FIG. 5I is a perspective view from the ABS, the dashed box 588 represents the location of the waveguide behind the ABS.

FIG. 5J is a close-up view of the hyperbolic metamaterial forming the peg of FIG. 5I. In certain embodiments, the plasmonic portion of the hyperbolic metamaterial is the same as the surrounding plasmonic materials for the top, bottom, and/or side walls 574, 572, 575, 577, and the dielectric portion of the hyperbolic metamaterial is the same material as forms the waveguide core 588. As shown, the waveguide core material can extend into the aperture to form alternating layers with the plasmonic material of the aperture NFT design's walls. However, the hyperbolic metamaterial can comprise any combination of materials described herein. FIG. 5K shows the field profile of a plasmon wave exciting the hyperbolic metamaterial peg of FIG. 5I. FIG. 5L further shows the temperature profile of the hyperbolic metamaterial peg. The high temperature areas correspond to the middle of the hyperbolic metamaterial peg where there is high dissipation of optical energy.

The reliability of HAMR heads is an impediment against the commercialization of HAMR drives. In particular, the lifetime and stability of the optical element of the write assembly (NFT peg and enlarged portion) are affected by the poor thermo-mechanical stability of the plasmonic, homogeneous metal materials (e.g., Au and Au alloys). Temperatures in a slider during writing conditions can reach above 300° C.

In conventional HAMR heads, the peg and enlarged portion are made of homogeneous plasmonic metals (either elemental or alloys). Such materials are difficult to deposit in high quality thin film structures due to their high surface free energy, which leads to high film porosity, roughness, and adhesion issues. The heat generated during the HAMR writing process has been shown to result in peg separation from the enlarged portion, deformation through densification, diffusion, grain growth, etc., and to loss of writing ability.

Embodiments discussed herein are directed to an NFT at least partially comprised of a thermally stable nanostructured metal/ceramic composite material. The material exhibits high thermal stability and an extremely high broad-band photonic density of states at the interface between the metallic and ceramic components of the composite material. These composite materials are known as hyperbolic metamaterials. Hyperbolic metamaterials behave as a metal when light passes through them in one direction and like a dielectric when light passes through in the perpendicular direction—also called extreme anisotropy. The name reflects the fact that the composite material's dispersion relation forms a hyperboloid. Hyperbolic metamaterials can be incorporated into an NFT and designed to support hyperbolic dispersion of light, allowing for the propagation of highly confined modes. This confinement not only allows the NFT to achieve a high thermal gradient hotspot on a magnetic recording medium but also to produce a hotspot having a predefined shape through the design of the hyperbolic metamaterial properties. Such shapes can be used to optimize particular aspects of the written bits, for example, to reduce the curvature of the transitions between bits.

In some embodiments, the NFT, e.g., the peg portion, comprises an optical hyperbolic metamaterial such as TiN/$Al_xSc_{1-x}N$ or ZrN/$Al_xSc_{1-x}N$. A nitride-based composite material exhibits a much lower surface free energy and an enhanced surface plasmonic effect, similar to that of gold. However, other hyperbolic metamaterials where the dielectric portion has n>k and the metal portion has k>n, where n is the real part of the refractive index and k is the imaginary part of the refractive index, may be used. The material properties may be further tuned to exhibit a particular mode shape. Examples include hyperbolic metamaterials that have at least one material resistant to chemical changes and/or resistant to deformation, etc. For example, Au and $TaO_x$, where $TaO_x$ is a robust material, Rh and $SiO_x$, where Rh is a robust material, Ir and $AlO_x$ where Ir is a robust material, $TaO_x$ and Ir where both are robust, and $TaO_x$ and TaN where both are robust. The use of $O_x$ throughout this discussion, such as in $TaO_x$, indicates a stoichiometric oxide of tantalum (or other compound when used with another element such as silicon or aluminum). For example, $TaO_x$ can represent $TaO_2$ as well as $Ta_2O_5$.

Thus, example combinations of materials forming hyperbolic metamaterials applicable to the discussions herein include Rh with $SiO_x$, $AlO_x$, and/or $TaO_x$; Ir with $SiO_x$, $AlO_x$, and/or $TaO_x$; and Au with $SiO_x$, $AlO_x$, and/or $TaO_x$. Other example combinations include Cu and/or Ag with $SiO_x$, $AlO_x$, and/or $TaO_x$; gold alloys with oxides; metal nitrides with metal nitrides such as TiN with AlN where TiN is the metal (k>n) and AlN is a dielectric (n>k); and metal nitrides with metal oxides such as MN, ZrN and/or TiN with $SiO_x$, $AlO_x$, $TiO_x$, $NbO_x$, and/or $TaO_x$. Further examples include Cu, Ag, Au, Rh, Ir, Pd, Pt, Os, Nb, and/or Mo with $SiO_x$, $AlO_x$, $TiO_x$, $NbO_x$, $TaO_x$, amorphous Si, hydrogenated amorphous Si, SiC, and/or hydrogenated SiC. While the entire NFT may be comprised of these composite materials, embodiments described herein address at least a peg structure being formed of hyperbolic metamaterials.

In contrast to homogenous, or elemental, plasmonic materials currently used in the light delivery structures of HAMR heads, hyperbolic metamaterials such as nitride-based composite materials such as $TiN/Al_xSc_{1-x}N$ and $ZrN/Al_xSc_{1-x}N$ exhibit very low surface free energies (e.g., ~1,000 $mJ/m^2$ for gold vs. ~50 $mJ/m^2$ for nitrides), which allows these materials to build high quality epitaxial nanostructures (e.g., multilayers and superlattices)—even with known deposition techniques. Such deposition techniques can include physical or chemical deposition methods such as radio frequency (rf) sputtering, direct current (dc) sputtering, reactive magnetron sputtering, chemical vapor deposition, pulsed laser deposition, and molecular beam epitaxy. The use of nanostructured plasmonic composite materials in the NFT promote optical component stability and provide long term writer stability and reliability.

Figure 6A:
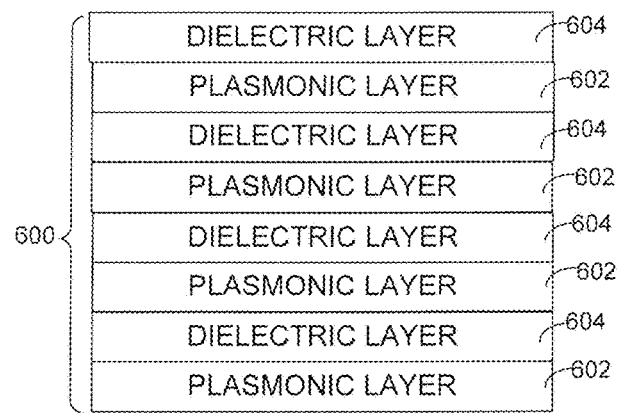
FIGS. 6A-C are cross-sectional diagrams of a NFT peg comprising a hyperbolic metamaterial in accordance with various embodiments discussed herein.

An NFT peg, and/or other portions of an NFT, comprised of hyperbolic metamaterials has an alternating thin film structure, e.g., a plurality of bi-layers, as shown in FIG. 6. The NFT peg 600 comprises at least one plasmonic metallic material layer 602 and at least one dielectric, or insulating, material layer 604, i.e., at least one bi-layer structure. However, the peg 600 typically comprises a plurality of bi-layer structures, for example, four bi-layer structures are shown. In certain embodiments, the metallic material is a nitride-based plasmonic material such as TiN or ZrN. The insulating material, or ceramic dielectric, forms sharp interfaces with the plasmonic material and is also nitride based such as Together the hyperbolic metamaterial peg 600 comprises $TiN/Al_xSc_{1-x}N$ and/or $ZrN/Al_xSc_{1-x}N$. The amount of Sc is about 10-30% to stabilize the AlN in cubic phase such that x is about 0.7-0.9 and in certain embodiments, x=0.88, in the formula, $Al_xSc_{1-x}N$. For example, $Al_xSc_{1-x}N$ thin films are sandwiched between plasmonic layers, such as TiN, as described in U.S. Patent Publication No. 2015/0285953, incorporated herein in its entirety. Alternatively, $Al_xSc_{1-x}N$ thin films are sandwiched between plasmonic layers, such as ZrN, or sandwiched between alternating layers of TiN and ZrN (e.g., . . . /TiN/$Al_xSc_{1-x}$N/ZrN/ $Al_xSc_{1-x}N$/ . . . ). Thus, the layered hyperbolic metamaterial forms at least the peg of an NFT.

The plasmonic effect of the NFT can be modified by varying aspects of the hyperbolic metamaterials used to form the peg and/or enlarged region of the NFT. Both light delivery in the head as well as the media thermal design influence control of the hot spot. For a given media thermal design, the hot spot size and shape depend on many factors including the orientation of the superlattice plane of the hyperbolic metamaterial with respect to the down-track direction, the refractive index contrast of the hyperbolic metamaterial components, the thickness of the layers forming the superlattice, laser modes, and the peg's shape and size. For example, the plasmonic effect of the peg can be enhanced by changing, such as reducing, the thickness of one or both of the metallic and dielectric layers as well as altering the number of layers. Also, the hyperbolic metamaterial stoichiometry can be altered based upon the wavelengths emitted by the laser to minimize losses and improve coupling efficiency between the head and recording media. For example, the stoichiometry of the TiN, or plasmonic material component, of the hyperbolic metamaterial peg can be altered to enhance the plasmonic effect of the NFT within a desired wavelength range. In other embodiments, the hyperbolic metamaterial can be composed of an array of apertures and/or rods instead of layers, which are oriented to achieve desired peg properties.

Further, the orientation of the hyperbolic metamaterial superlattice structures can be modified to achieve a desired light/hot spot geometry and to enhance the plasmonic effect in a desired direction. For example, the orientation of the superlattice plane of the hyperbolic metamaterial with respect to the down-track direction can be used to either enhance the down-track thermal gradient or to reduce the curvature of the transitions. The down-track or cross-track profile of the peg can be adjusted to modify the written track width and the down-track gradient. In certain embodiments, a narrow peg in the cross-track direction writes a narrow track, and in most embodiments, reducing the down-track thickness of the peg will increase the down-track thermal gradient and therefore the areal density.

Figure 6B:
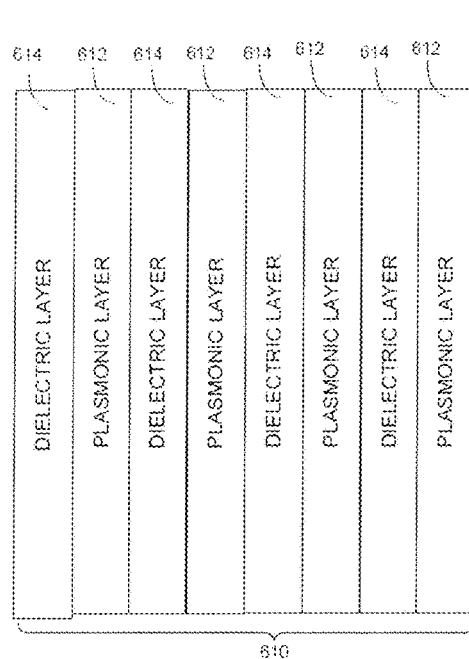
Figure 6C:
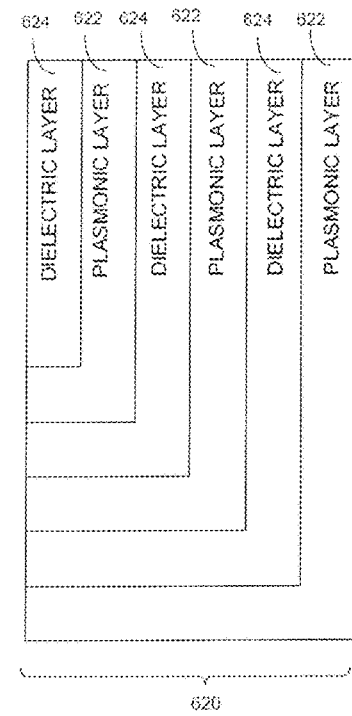

Using FIGS. 4A-6C as an example, embodiments are directed to an apparatus comprising a slider 400 configured for HAMR. A near-field transducer 412 is situated at or near an air bearing surface 414 of the slider 400. An optical waveguide of the slider 410 is configured to couple light from a light source 402 to the NFT 412. The NFT 412 includes a peg 415, which comprises a hyperbolic metamaterial. In some embodiments, the NFT 412 includes a peg 415 and an enlarged portion 413, both of which comprise a hyperbolic metamaterial. The hyperbolic metamaterial forms the peg 600 in a multilayered structure, as shown in FIG. 6. The alternating layers of material are orientated along the air bearing surface 414 such that each layer 602 and 604 is proximate the air bearing surface 414 (e.g., the cross-section of FIG. 6 faces the recording medium). Alternatively, this can be illustrated as shown in FIG. 6B where the layers 612, 614 of peg 610 extend vertically from the ABS into the slider such as when the layers 612, 614 are deposited on a sidewall. In further embodiments, hyperbolic metamaterial layers 622, 624 can be deposited in a spacer-like process on a step feature to form the peg 620 of FIG. 6C.

Turning now to FIG. 7A, there is shown a cross-sectional view of an NFT peg 700 comprising a hyperbolic metamaterial in accordance with various embodiments. The hyperbolic metamaterial is structured as a stack of multilayers, such as ten layers comprising five bi-layer structures. As discussed above, the bi-layer structures are a combination of a metal layer 702, here gold (Au), and a dielectric layer 704, here tantalum oxide (TaO$_x$). The peg 700 dimensions were arbitrarily selected to provide a cross-sectional area of 50 nm by 50 nm, and each of the layers 702 and 704 is five nanometers thick, for non-limiting illustrative purposes. The cross-sectional area shown in FIG. 7A is planar with, or parallel to, the air-bearing surface of a HAMR slider. For example, the terminal end of the NFT peg having the cross-sectional area shown may be exposed at the air-bearing surface, or may be recessed within the recording head and parallel to the air-bearing surface. Further details of the NFT peg having the cross-sectional area shown in FIG. 7A include using gold as a heatsink. In certain embodiments, the cross-sectional area of FIG. 7A can represent a peg as shown in the NFT design of FIG. 5J, where the NFT gap can be formed of aluminum oxide (e.g., low index material) and the exciting waveguide can be tantalum oxide. As an alternative to the materials discussed above, these embodiments involve a substantial index contrast in the materials forming the hyperbolic metamaterial. For example, one material has a high index and the other a low index where n1/n2>1.5 and k1~k2~0. Some example materials for n1 include high index materials such as silicon, silicon carbide, aluminum nitride, silicon nitride, SiO$_x$, AlO$_x$, HfO$_x$, SrTiO$_x$, TaO$_x$, BaTiO$_x$, NbO$_x$, BiTiO$_x$, TiO$_x$, diamond, etc. For n2, some example low index materials include MgF, MgO, SiO$_x$, AlO$_x$, TaO$_x$, etc.

FIG. 7B shows a profile of a hotspot 710 produced on the surface of a magnetic recording medium using the hyperbolic metamaterial peg 700 shown in FIG. 7A. The hotspot profile 710 corresponds to an excitation with the highest order modes supported by the hyperbolic metamaterial of peg 700. To illustrate the shape of the hotspot 710, FIG. 7B includes an outline of the hyperbolic metamaterial peg 700 overlaid upon the resulting hotspot 710. For a Au/TaO$_x$ peg design, the resulting hotspot is elongated along the middle of the peg 700 in the down-track direction to achieve increased track density. However, the hot spot can also or optionally be elongated in the cross-track direction by tuning deposition of the layers forming the hyperbolic metamaterial peg 700. For example, the hot spot can be elongated by increasing the width of the hyperbolic metamaterial.

Similar to FIG. 7A, FIG. 8A shows a cross-sectional view of an NFT peg 800 comprising a hyperbolic metamaterial in accordance with various embodiments. The hyperbolic metamaterial is structured as a stack of multilayers, such as ten layers comprising five bi-layer structures. As discussed above, the bi-layer structures are a combination of a metal layer 802, here rhodium (Rh), and a dielectric layer 804, here tantalum oxide (TaO$_x$). The peg 800 dimensions were arbitrarily selected to provide a cross-sectional area of 50 nm by 50 nm, and each of the layers 802 and 804 is five nanometers thick, for non-limiting illustrative purposes. The cross-sectional area shown in FIG. 8A is planar with, or parallel to, the air-bearing surface of a HAMR slider. For example, the terminal end of the NFT peg having the cross-sectional area shown may be exposed at the air-bearing surface, or may be recessed within the recording head and parallel to the air-bearing surface. Further details of the NFT peg having the cross-sectional area shown in FIG. 8A include using gold as a heatsink. In certain embodiments, the cross-sectional area of FIG. 8A can represent a peg as shown in the NFT design of FIG. 5J, where the NFT gap can be formed of aluminum oxide (e.g., low index material) and the exciting waveguide can be tantalum oxide or other materials having a substantial index contrast.

FIG. 8B shows a profile of a hotspot 810 produced on the surface of a magnetic recording medium using the hyperbolic metamaterial peg 800 shown in FIG. 8A. The hotspot profile 810 corresponds to an excitation with the highest order modes supported by the hyperbolic metamaterial of peg 800. To illustrate the shape of the hotspot 810, FIG. 8B includes an outline of the layers of the hyperbolic metamaterial peg 800 overlaid upon the resulting hotspot 810. For a Rh/TaO$_x$ peg design, the resulting hotspot is larger and takes on a squared shape largely corresponding to the cross-sectional area of the hyperbolic metamaterial peg 800. Additionally, the Rh/TaO$_x$ design has lower curvature than the Au/TaO$_x$ design as illustrated from both FIGS. 8A-B.

The hyperbolic metamaterial NFT peg increases both cross-track and down-track thermal gradients as compared with a peg comprised of homogenous plasmonic material. The down-track thermal gradient (TG) for peg 700 of FIGS. 7A-B (Au/TaO$_x$ layers) is 20.24 K/nm (Kelvin/nanometer) and the cross-track thermal gradient is 10.17 K/nm. The down-track thermal gradient for peg 800 of FIGS. 8A-B (Rh/TaO$_x$ layers) is 19.63 K/nm and the cross-track thermal gradient is 20.79 K/nm. These values can be compared with a non-metamaterial peg, for example, where a gold (Au) peg has a down-track thermal gradient of 5.28 K/nm and a cross-track thermal gradient of 5.05 K/nm. These gradients are obtained at a contour of T=405° C. to achieve a track width of 50 nm. These high order modes are excited through transverse electric (TM) polarization—electric field polarized perpendicular to the multilayer plane. Lower order modes also offer an increase in the thermal gradient of hyperbolic metamaterial pegs as compared with non-metamaterial pegs, which is described below with reference to FIGS. 9A-10B.

FIG. 9A shows the electric field profile of the lowest TM mode excited in a hyperbolic metamaterial peg 900. The peg 900 comprises a hyperbolic metamaterial comprising a plurality of bi-layer structures where the plasmonic layer 902 is Au and the dielectric layer 904 is TaO$_x$. Similar to the peg 700 in FIG. 7A, there are five bi-layer structures for a total of ten layers. FIG. 10A shows the electric field profile of the lowest TM mode excited in a hyperbolic metamaterial peg 1000. The peg 1000 comprises a hyperbolic metamaterial comprising a plurality of bi-layer structures where the plasmonic layer 1002 is Rh and the dielectric layer 1004 is TaO$_x$. Similar to the peg 800 in FIG. 8A, peg 1000 has five bi-layer structures for a total of ten layers. It is noted that these lowest modes can be excited with a relatively simple NFT design, such as a plasmonic generator (PPG design), NTS design, NTL design, or an aperture design. FIGS. 9B and 10B show profiles of hotspots 910 and 1010 obtained for the modes excited in the hyperbolic metamaterial pegs 900 and 1000, respectively.

Similar to the high order modes, the low order modes also increase both cross-track and down-track thermal gradients in hyperbolic metamaterial NFT pegs as compared with a peg comprised of homogenous plasmonic material. The down-track thermal gradient (TG) for peg 900 of FIGS. 9A-B (Au/TaO$_x$ layers) is 13.10 K/nm and the cross-track thermal gradient is 8.87 K/nm. The down-track thermal gradient for peg 1000 of FIGS. 10A-B (Rh/TaO$_x$ layers) is 10.97 K/nm and the cross-track thermal gradient is 14.16 K/nm. These values can be compared with a non-metamaterial peg where a gold (Au) peg has a down-track thermal gradient of 6 K/nm and a cross-track thermal gradient of 6 K/nm.

Figure 11A:
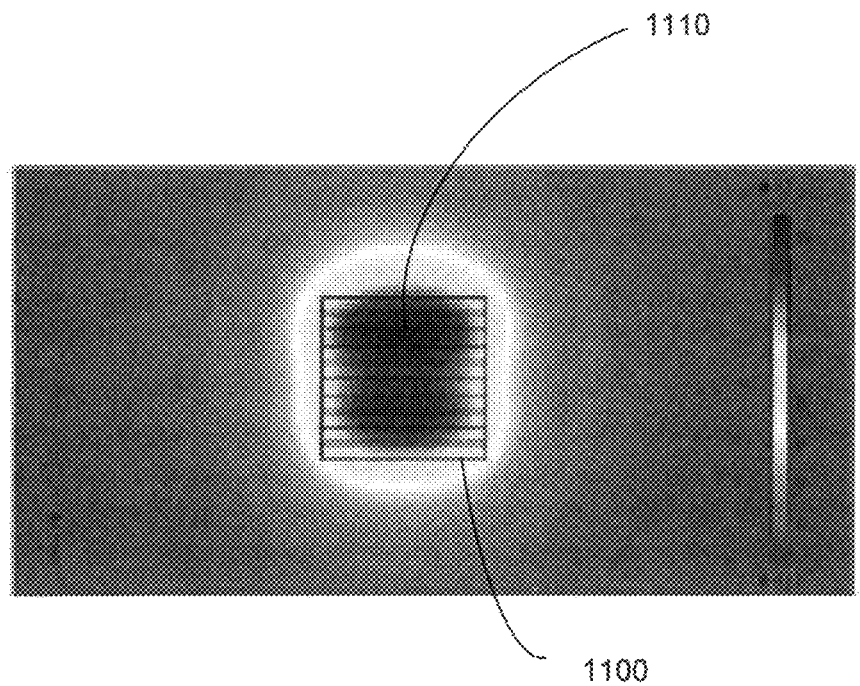
FIG. 11A shows a hotspot produced on a magnetic recording medium using a hyperbolic metamaterial peg design in accordance with various embodiments discussed herein.
Figure 11B:
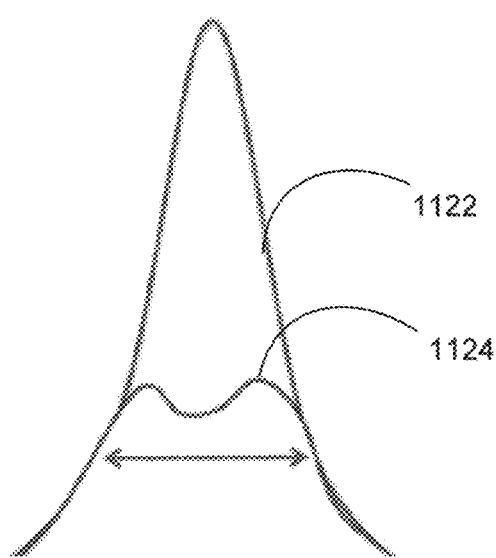
FIG. 11B shows a comparison of the high thermal gradient of a homogenous plasmonic material peg with that of a hyperbolic metamaterial peg in accordance with various embodiments discussed herein.

FIGS. 11A-B illustrate the differences between an excitation with a peg of homogenous plasmonic material and a hyperbolic metamaterial peg. For example, FIG. 11A is a profile of a hotspot 1110 produced on the surface of a magnetic recording medium using a Rh/TaO$_x$ peg 1100. The peg 1100 was analyzed for the highest order mode within the hyperbolic metamaterial, normalizing the hotspot 1110 to a maximum temperature of the media of 500° C., which takes into account possible damage produced to lube around the recording layer. Comparison of the down-track thermal gradient (TGDT) as a function of track width (TW in nm) for different NFT designs indicates that the thermal gradient obtained by the Rh/TaO$_x$ hyperbolic metamaterial peg 1100 at a track width of 46 nm is 14.25 K/nm down-track and 10.96 K/nm cross-track. At a track width of 46 nm, the thermal gradient for the Rh/TaO$_x$ hyperbolic metamaterial peg 1100 was the highest of the compared designs.

Further, FIG. 11B shows that due to the interference of multiple spots it is possible to obtain a high thermal gradient 1124 for a high track width, thus achieving the squaring of the hotspot 1110. FIG. 11B further shows the difference between a high thermal gradient 1122 obtained via a narrow, homogenous material peg and a high thermal gradient 1124 obtained through the Rh/TaO$_x$ hyperbolic metamaterial peg 1100. It can be seen that a substantially square thermal gradient 1124 can be obtained using the hyperbolic metamaterial peg 1100. This square shaped hotspot 1110 and thermal gradient 1124 provide higher bit density, can better cover a larger track width, and help reduce the amount of head energy dissipated as power distribution is larger than for a narrower peg design (e.g., a peg of homogenous plasmonic material).

Alternatively, the hyperbolic metamaterials described herein as multilayer structures can be fabricated as a granular two-phase composition. The hyperbolic metamaterial NFT peg and/or enlarged portion still comprises a metallic material and an insulating material. The insulating material, or ceramic dielectric, forms sharp interfaces with the plasmonic, metallic material. In certain embodiments, the hyperbolic metamaterial comprises TiN/Al$_x$Sc$_{1-x}$N, ZrN/Al$_x$Sc$_{1-x}$N, Au/TaO$_x$, and/or Rh/TaO$_x$. The stoichiometry can be altered based upon the wavelengths emitted by the laser to minimize losses and improve coupling efficiency with the recording medium. In the two-phase structure of the hyperbolic metamaterial one material comprises "grains" and the other a "segregant" or matrix material surrounding the grains. In certain embodiments the plasmonic, metallic material can form the grains while the dielectric material forms the segregant, and in other embodiments, the dielectric material forms the grains with the plasmonic material forming the segregant. The grains can be about 5-10 nm or smaller in diameter such that the NFT peg can also be referred to as a nanocomposite layer. The plasmonic effect of the hyperbolic metamaterial composite layer can be altered by increasing the volume of the metallic material (e.g., TiN, ZrN, Au, and/or Rh) in the hyperbolic metamaterial since that will increase the interface surface area with the insulator material, and the sharp interface between the materials enhances the plasmonic effect. Thus, the two-phase hyperbolic metamaterial forms a granular, or rod-like structure as the NFT peg and/or enlarged portion.

Systems, devices, or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality.

Various modifications and additions can be made to the disclosed embodiments discussed above. Accordingly, the scope of the present disclosure should not be limited by the particular embodiments described above, but should be defined only by the claims set forth below and equivalents thereof.

What is claimed is:

1. An apparatus, comprising:
   a slider configured for heat-assisted magnetic recording;
   a near-field transducer comprising a peg situated at or near an air bearing surface of the slider, the peg comprising a plurality of sublayers, the sublayers comprising alternating an elemental plasmonic material sublayer and an insulating material sublayer to comprise a hyperbolic metamaterial, wherein the elemental plasmonic material of the peg is the same material as that of at least one wall of the near-field transducer surrounding the peg and the insulating material of the peg is the same material as that of a waveguide core; and
   an optical waveguide of the slider configured to couple light from a light source to the near-field transducer, the waveguide including the waveguide core.

2. The apparatus of claim 1, wherein the near-field transducer further comprises an enlarged portion from which the peg extends and the enlarged portion comprises a hyperbolic metamaterial.

3. The apparatus of claim 1, wherein the plasmonic sublayer comprises Au and the insulating sublayer comprises TaO$_x$.

4. The apparatus of claim 1, wherein the plasmonic sublayer comprises Rh and the insulating sublayer comprises TaO$_x$.

5. The apparatus of claim 1, wherein the plasmonic sublayer comprises Ir and the insulating sublayer comprises TaO$_x$.

6. The apparatus of claim 1, wherein the optical waveguide comprises at least one cladding layer proximate the near-field transducer.

7. The apparatus of claim 1, wherein each sublayer is proximate the air bearing surface.

8. The apparatus of claim 1, wherein the hyperbolic metamaterial is configured to form a hotspot on a magnetic recording medium, the hotspot having a substantially square shape.

* * * * *